example may be represented by the graphic equation:

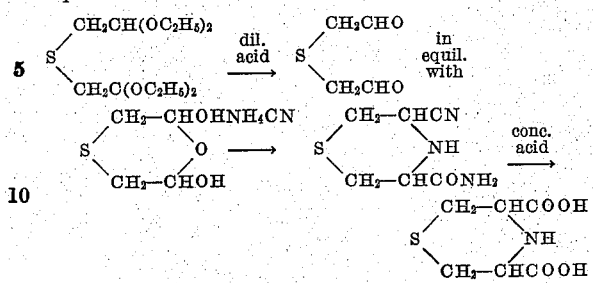

In the above equation, the reaction of the ammonium cyanide is shown as one with thiodiacetaldehyde and 3,5-dihydroxythioxane in equilibrium. It is my belief that the reaction actually involves only the thiodiacetaldehyde and the ammonium cyanide; but I have shown the equation in the above form as I believe that in aqueous solution the thiodiacetaldehyde and 3,5-dihydroxythioxane always exist in equilibruim. In any case, I do not wish to be limited by any theoretical considerations, as 3,5-dihydroxythioxane, when used in water, or the product resulting from the treatment of acetalyl sulfide with dilute acid, both yield the nitriloamide when treated with ammonia and hydrogen cyanide or their equivalents.

The acidic hydrogens of the dicarboxylic acids may be replaced by a monovalent metal, such as sodium or potassium, or an equivalent of a polyvalent metal, such as calcium or magnesium, or a nitrogen base, such as ammonia, alkylamines or dialkylamines, such as ethylamine or diethylamine, alkynol amines, such as diethanolamine, phenylpropanolamine or the like, to form salts, advantageously by simple neutralization. The dicarboxylic acids do not form crystallizable salts with acids, although they do dissolve in mineral acids, but their esterified derivatives, with the carboxylic groups blocked, form such salts, as with the hydrohalogen acids, etc.; such salts being formed because of the basic nature of the trivalent nitrogen.

The dicarboxylic acids are readily converted into the corresponding mono- or di- acid chlorides, as by treatment with sulfonyl chloride; and these chlorides may be advantageously used as intermediates for the production of esters, the mono- acid chlorides giving the corresponding mono- esters, and the di- acid chlorides giving the di- esters with alcohols or phenols. Treatment of the acid chlorides with ammonia produces the corresponding acid amides, which are also useful as intermediates, and which may be dehydrated to yield the corresponding nitriles. These compounds, the acid halides, the acid amides, and the nitriles are included in the group designated as the acid derivatives of the dicarboxylic acids.

I claim:
1. Thiazane-3,5-dicarboxylic acids.
2. Thiazane-3,5-dicarboxylic acids having the formula

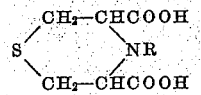

in which R is a radical from the class consisting of hydrogen, alkyl, aralkyl, aryl and alicylic radicals.

3. The amide of 3-nitrilothiazane-5-carboxylic acid, having the formula

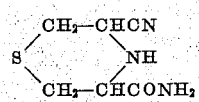

4. Thiazane-3,5-dicarboxylic acid, having the formula

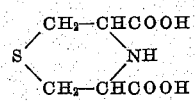

5. The process which comprises reacting an aqueous solution containing thiodiacetaldehyde and 3,5-dihydroxythioxane, in equilibrium, with hydrogen cyanide and a compound of the class consisting of ammonia and primary amines.

6. The process which comprises treating an aqueous solution containing thiodiacetaldehyde and 3,5-dihydroxythioxane, in equilibrium, with hydrogen cyanide and ammonia.

7. The process of preparing the amide of 3-nitrilothiazane-5-carboxylic acid which comprises treating an aqueous solution containing thiodiacetaldehyde and 3,5-dihydroxythioxane in equilibrium with ammonia and hydrogen cyanide.

8. The process of preparing thiazane-3,5-dicarboxylic acids which comprises hydrolyzing the corresponding nitriloamide with concentrated acid.

9. The process which comprises treating an aqueous solution containing thiodiacetaldehyde with hydrogen cyanide and a compound of the class consisting of ammonia and primary amines.

10. The process which comprises treating an aqueous solution containing thiodiacetaldehyde with hydrogen cyanide and a compound of the class consisting of ammonia and primary amines and hydrolyzing the resulting product.

11. Amides of 3-nitrilo-thiazane-5-carboxylic acids, having the formula

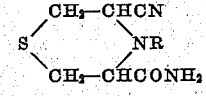

in which R is an alkyl radical.

ROBERT DE WOLF COGHILL.

Feb. 27, 1940.  E. A. CORBIN, JR  2,191,453
WASHBASIN
Filed Dec. 7, 1937
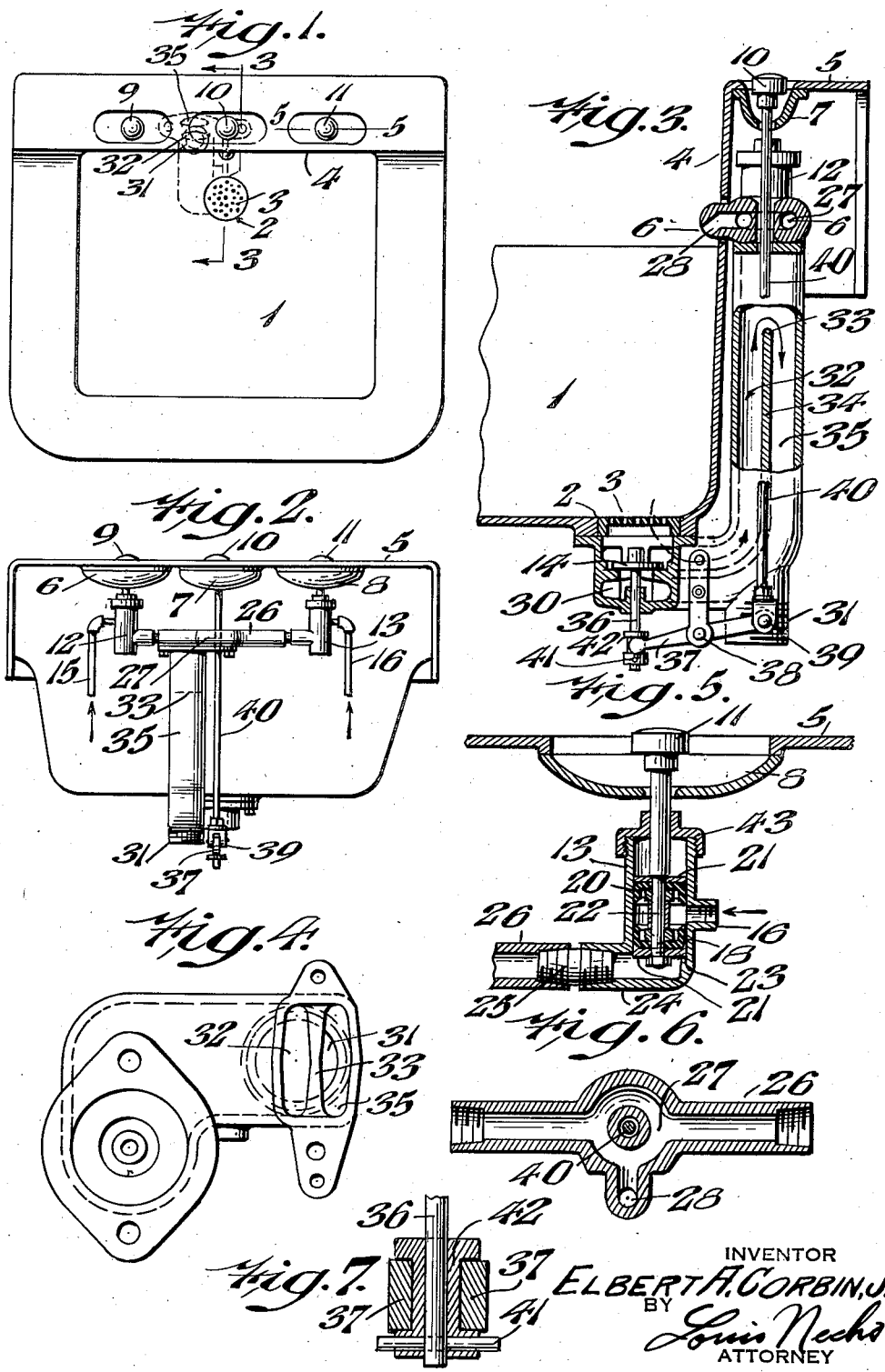
INVENTOR
ELBERT A. CORBIN, JR.
BY
Louis Nechs
ATTORNEY